United States Patent
Edwards et al.

(10) Patent No.: US 7,444,666 B2
(45) Date of Patent: Oct. 28, 2008

(54) MULTI-DOMAIN AUTHORIZATION AND AUTHENTICATION

(75) Inventors: Nigel John Edwards, Bristol (GB); Jason Rouault, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1339 days.

(21) Appl. No.: 10/202,816

(22) Filed: Jul. 25, 2002

(65) Prior Publication Data

US 2003/0023880 A1 Jan. 30, 2003

(30) Foreign Application Priority Data

Jul. 27, 2001 (GB) .................. 0118439.9

(51) Int. Cl.
*H04L 9/00* (2006.01)
*G06F 17/00* (2006.01)
*H04K 1/00* (2006.01)

(52) U.S. Cl. ..................... 726/1; 713/154; 713/155; 713/162

(58) Field of Classification Search .............. None
See application file for complete search history.

(56) References Cited

U.S. PATENT DOCUMENTS

| 5,815,665 | A | 9/1998 | Teper et al. |
| 5,818,936 | A | 10/1998 | Mashayekhi |
| 6,052,785 | A | 4/2000 | Lin et al. |
| 6,519,571 | B1 * | 2/2003 | Guheen et al. ............. 705/14 |
| 6,578,076 | B1 * | 6/2003 | Putzolu ..................... 709/223 |
| 6,615,350 | B1 * | 9/2003 | Schell et al. ................ 713/168 |
| 6,691,227 | B1 * | 2/2004 | Neves et al. ............... 713/162 |
| 2002/0133534 | A1 * | 9/2002 | Forslow .................... 709/200 |

FOREIGN PATENT DOCUMENTS

| WO | WO99/40503 | 8/1999 |
| WO | WO01/15377 A | 3/2001 |

OTHER PUBLICATIONS

Estrin, Deborah, Steenstrup, Martha. Tsudik, Gene. "A Protocol for Route Establishment and Packet Forwarding Across Multidomain Internets". Feb. 1993. IEEE/ACM Transactions on Networking, vol. 1. Relevant pp. 56-70. Found on the World Wide Web at: http://ieeexplore.ieee.org/iel4/90/5814/00222907.pdf?tp=&isnumber=5814&arnumber=222907&punumber=90.*

(Continued)

*Primary Examiner*—Ayaz Sheikh
*Assistant Examiner*—Jeremiah Avery (57) ABSTRACT

A method of multi-domain authorization/authentication on a computer network comprises: a user making a request to a policy enforcement point of a computer for access to information on the computer; providing a location address for a user's authorization and/or authentication information, a policy decision point of the service on the computer network then verifying the authorization/authentication information; and the user being given access by the PEP to the information or the service requested, if the request is accepted, wherein the user's authorization/authentication and/or further information is located on a meta policy decision point (MPDP).

25 Claims, 4 Drawing Sheets

OTHER PUBLICATIONS

Hallam-Baker, P.: "Security Assertions Markup Language. Core assertion Architecture—Examples and Explanations", Organization for the Advancement of Structured Information Standards 'OASIS!, 'Online! May 14, 2001, document No. XP-002215730, pp. 1-24.

Vollbrecht, J., et al., "RFC 2940 AAA Authorization Framework", Internet Society, 'online!, Aug. 2000, Doc. No. XP0022157321, pp. 1-35.

"AAA Protocols: Authentication, Authorization, and Accoutning for the Internet", Internet Computing, http://computer.org/internet; Nov.-Dec. 1999, pp. 75-79.

Myers, M., et al., "Internet X.509 Certificate Request Message Format" Network Working Group, printed May 25, 2004 from http://www.ietf.org/rfc/rfc2511.txt?number=2511. (22 pages).

Website for Oasis Security Services TC, printed May 25, 2004 from http://www.oasis-open.org/committees/tc_home.php?wg_abbrev=security. (5 Pages).

Dierks, T., et al., "The TLS Protocol—Version 1.0", Network Working Group, printed May 25, 2004 from http://www.ietf.org/rfc/rfc2246.txt?number=2246. (71 Pages).

Berners-Lee, T., et al., "Hypertext Transfer Protocol—HTTP/1.0", Network Working Group, printed on May 25, 2004 from http://www.ietf.org/rfc/rfc1945.txt?number=1945. (46 Pages).

Myers, M., et al., "X.509 Internet Public Key Infrastructure Online Certificate Status Protocol—OCSP", Network Working Group, printed May 25, 2004 from http://www.ietf.org/rfc/rfc2560.txt?number=2560. (21 pages).

Website: http://www.ietf.org/html.charters/sacred-charter.html., Securely Available Credentials (Sacred), printed May 25, 2004 (3 Pages).

* cited by examiner

MULTI-DOMAIN AUTHORIZATION AND AUTHENTICATION

FIELD OF THE INVENTION

This invention relates to a method of performing multi-domain authorisation and authentication in a computer network.

DESCRIPTION OF RELATED PRIOR ART

In the field of computer networks the term "domain" is widely used to refer to a part or all of a computer network for which a set of users have (potentially varied levels of) access. In a single organisation a computer network may have a number of different domains, for example corresponding to a research department domain, a marketing department domain and an accounting department domain. On a much larger scale a computer network may be multi-national and may include a domain relating to an online e-business website as one domain and a domain for an internet service provider independent from the e-business website.

In order for authorised users of one domain to access information held on other domains, or to communicate with users on other domains multi-domain authorisation and authentication is required. Each domain may have a Privilege Management Infrastructure (PMI) with which to manage which users are able to access particular information. A PMI may be implemented as a plug-in to a web server, which may integrate with a database management system to give different authorisations to different users and different types of user.

A PMI may be used in the form of a Policy Decision Point (PDP) which can be used to store and/or assess information and make decisions about users of a particular domain, the user's roles and entries as to what parts of the system that user can access. A PDP on being given a particular set of criteria for a user issues a decision on whether they are authorised to access information which they have requested access to. The decision may be based on information provided dynamically and also on some stored information.

A decision from a PDP is passed to a Policy Enforcement Point (PEP), which could be located in the same part of a computer system as a PDP, and is used to carry out the decision of the PDP. A PEP is located in the component where the decision needs to be enforced, so for a standard external website the PEP would be located in a computer system outside a firewall security screen, whereas a PDP would be located in a computer inside that firewall.

An existing method of cross domain access which uses cross domain sign-on and session synchronisation is based on using attribute certificates. An agreed standard is the internet X.509 standard [X.509-1988] CCITT Recommendation X.509: The Directory—Authentication Framework. 1988; [X.509-1997] ITU-T Recommendation X.509: The Directory Authentication Framework, 1997; and [X.509-2000] ITU-T Recommendation X.509: The Directory—Public-Key and Attribute Certificate Frameworks, 2000. The format of X.503 Certificate Request Messages is disclosed in The Internet Engineering Task Force (IETF) Request for Comments (RFC) number 2511 dated March 1999. In that document there is described a Certificate Request Message Format (CRMF), which is a syntax used to convey a request for a certificate from a Certification Authority (CA) for the purposes of X.509 certificate production. Such a request will typically include a public key and associated registration information (as discussed below).

In existing multi-domain authorisation and authentication systems much use is made of certificates which require the use of public key cryptography, comprising a public key and a private key for encryption. A public key, as its name suggests, is publicly available and would be included with a certificate. The public key is used to decrypt a request issued by a requester to thereby ensure that the request has been generated by a holder of a private key associated with the public key. Conversely, a message encrypted with the public key can only be decrypted by the holder of the private key. A private key would typically be kept by the owner of the private key in a secure place, possibly on a floppy disc, but more usually on a particular part of a user's computer.

Ordinary X.509 certificates can be used for a single sign on. PMI's can issue certificates to their clients that do not already have a certificate.

Alternatively, under the OASIS (Organisation for Advancement of Structural Information Standards) SAML (security assertion markup language) standard (an XML format), when a user begins a session at a site a short lived attribute certificate (which may include details as to the user's identity and particular information, such as financial information or bank details in the example of an on-line shopping website) would be issued that captures session information inputted during the session and mikes it available to other sizes.

The OASIS SAML standard uses the notion of an issuing authority that issues signed assertions (which could also be called attribute certificates), which assertions are received by a PDP. In the OASIS format a PDP is only responsible for making decisions, not generating assertions. In the present invention the issuing authority is collapsed into the PDP. However, the system described could equally well be implemented in the OASIS SAML framework. The implementation described below uses X.509 and CRMF protocols. OASIS use XML encoding, but either can be used to successfully implement the invention.

It is acknowledged that an attractive method for a user to be able to access multiple domains on a computer network would be for a user to have a single sign-on to multiple Domains. The purpose of a multi-domain single sign-on is to avoid a user having to engage in significant actions to re-authenticate when the user moves from one site to another site in, for example, a different enterprise. Instead, the user's client computer server and the requested servers ensure that the authentication required for the new site is automatic. This avoids the common problem of having to remember many different passwords for different sites. It makes for much better user experience. Session synchronisation enhances single sign-on to include support for exchange of information associated with the user's most recent activity on a given site.

The purpose of multi-domain authorisation is to enable domains to securely exchange information that can be used for authorisation. A PDP in one domain might need to know some attribute of the client that can only be provided from another domain, for example the client's financial status. Cookies have been proposed and used as a way of transferring authentication and session information between sites. This approach has a number of problems. Cookies do not work well across domains, because generating a cookie on one site to be sent to another site is not well supported in browsers, because it is a security risk. In addition, cookies can be captured in transit (if not transmitted over a secure server link) and from the disc of a user's computer to be replayed by an attacker. The attacker will then look like the legitimate client with the cookie (this is called a masquerade attack).

Another approach proposed for transferring authentication and session information from one site to another is Universal Resource Locator (URL) encoding. In this case, when a user follows a link from one site to another site, the first site dynamically generates the URL pointing to the second site. The second site recognises the dynamically generated URL from the first site and is able to extract session and authentication information from it. This imposes a performance overhead on the computer (to dynamically generate the URLs) and is difficult to implement when the site has a lot of static Hypertext Mark-up Language (HTML) wages, because the static pages have to be processed by the server to have the links dynamically replaced.

Proxies have also been proposed as a way of implementing multi-domain authentication and authorisations. Proxies have doubtful scaling properties, because all requests are sent via the proxy, which could be become a bottle neck. Also, companies are not happy to be dependent on a proxy of a different enterprise for its security. There are difficult trust and administration issues. In addition, the proxy will also be a particularly valuable target for a would-be attacker.

In order to achieve multi-domain single sign on without the use of cookies, proxies or URL re-writing, the use of X.509 certificates is recommended. This requires that all users have an X.509 certificate issued and signed by a participating PMI and chained to a Certification Authority (CA). Alternatively, the public keys of certificate issuers may be configured into the PMIs as part of the business logic of the system. The PEP of each PMI could then choose to use the end user's client certificate for identifying the user, or based on business policy, require that the user authenticate using an alternative mechanism (for example a token or bio-metric information). The latter, acting as a form of secondary or step-up authentication is discussed below.

In the event that a user does not already possess a client certificate, each PMI should provide the ability to issue and sign an X.509 certificate upon user self registration. These PMI issued certificates will be chained to a common CA (or set of CAs), in a chain of certificates, each authenticated by a higher CA up to a root CA.

In many cases, a single sign-on may require different types of authentication depending on the resource being requested. For example, the user accessing tax-withholding information may require certificate-based authentication, while the same user accessing his health record information may require a form of bio-metric authentication. In many circumstances the way a PMI might handle such a scenario is when the user first accesses the tax-withholding information, the user's certificate would be used to identify the individual. If, during the session, the user requests access to his health records, then he will be prompted by the PMI to re-authenticate using a bio-metric. This is often referred to as "step-up authentication".

When PMIs are implementing step-up authentication in a multiple domain environment, it becomes important to communicate across the domains how the user has authenticated so that the PMI does not re-prompt the user for their credentials every time a level of authentication is required that is greater than a particular certificate allows. This means that some form of session information, minimally authentication type, needs to be shared across domains.

One approach to sharing such session information can be achieved using PDP to PDP communication, discussed later on. The public key in the user's certificate can be used to uniquely identify the user. To uniquely identify the user's session (assuming the entity supports multiple sessions) a unique session ID is needed. Having authenticated a user using their certificate, this enables a PDP in for example domain 1, to query a PDP in for example domain 2 for session information about that particular user. The domain 1 PDP might ask the domain 2 PDP how the user authenticated himself. The PDP of domain 1 may trust the PDP of domain 2 sufficiently not to ask the user to re-submit bio-metric authentication, if Domain 2 says that the user has already done so. Thus PDP1 requests the certificate (which includes session information) from PDP2.

It is an assumption that each PMI implementation will maintain minimal state information.

A problem with the approach discussed above is how does the PDP of a particular domain determine which other domains (and their PDPs) it should communicate with for session information. One possible solution to this problem is to store information about the user's session in the user's X.509 certificate (attribute certificate). The user would be issued with a new X.509's attribute certificate after each successful authentication to a PMI. This attribute certificate would contain such things as how, when, and where the user authenticated. However, to support such a scenario, it would require the user's browser to be capable of managing attribute certificates accordingly. For example, the PMI issuance of a new attribute certificate upon successful authentication would require the update or overwrite of any previously issued attribute certificates.

Current commercial browsers have limited certificate management abilities. Browsers such as Microsoft Internet Explorer and Netscape Navigator would not be able to support such management of X.509 attribute certificates as outlined above. The only way around the shortcomings of these browsers would be through the use of client-side components (i.e. a browser plug-in). The use of such client-side components is not always a popular one because most end users are unwilling to install software on their machines. However, in cases where such client-side components are used and supported industry wide, the issue of installing such software is minimized. For example, the Adobe Acrobat reader runs as a browser plug-in and most users do not have a problem installing it because they know that PDF documents are an industry standard and that the Acrobat reader plug-in is required to view those documents. If a browser plug-in was required to support cross-domain authentication and authorisation, it would only be acceptable if it were adopted across the industry.

Public key encryption-based single sign-on for web browsers is problematic for users who don't always use the same physical device, or user's that share access to a physical device. A way is needed to dynamically download key material and security credentials.

The browser plug-in as mentioned above would be downloadable, and therefore would be easy for mobile users to use from any physical device.

Figure 1:
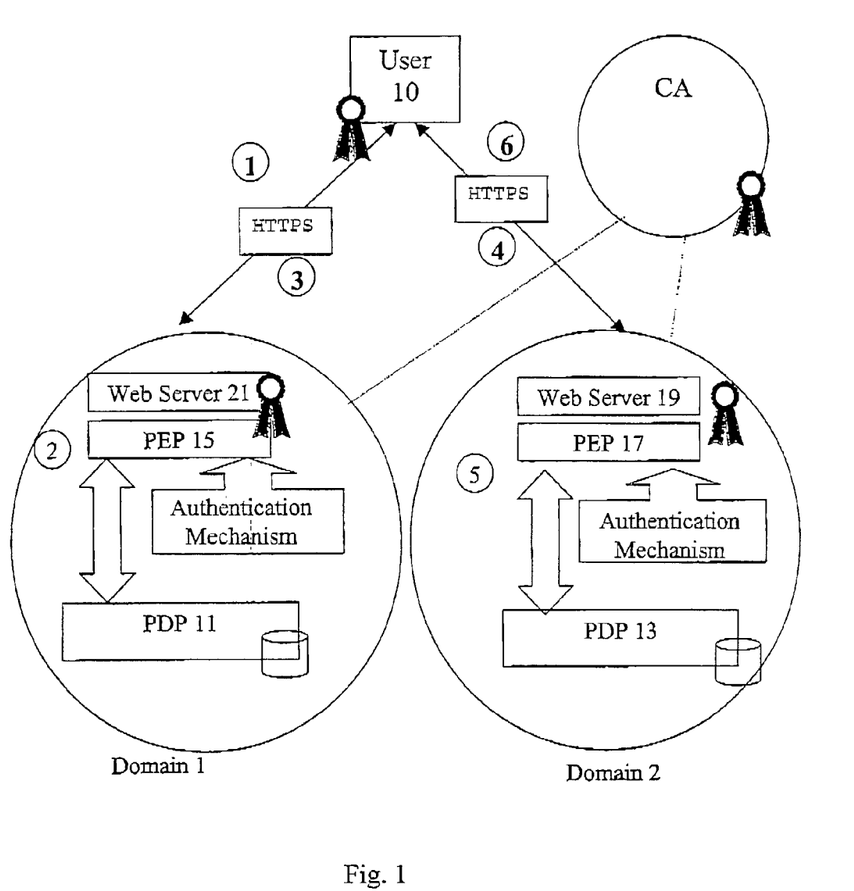
FIG. 1 is a schematic representation of communication between a user requiring information from two separate domains.

FIG. 1 shows schematically how a cross-domain web secure server may operate.

The reference numerals in FIG. 1 refer to the following events.

1. A user 10 requests a protected resource in Domain 1 and is prompted to authenticate.
2. PMI 11 in Domain 1 authenticates the user 10 and issues the user with an X.509 attribute certificate containing such session information as how, when and where this user 10 has authenticated.
3. The user 10 browser accepts the new certificate, updating or overwriting any existing cross-domain authentication/authorisation certificate.

4. User 10 requests a protected resource in Domain 2, passing newly created attribute certificate from Domain 1.
5. PMI 13 in Domain 2 determines, based upon the session information stored in the users attribute certificate, whether or not re-authentication or step-up authentication is required for the resource being requested.
6. If the user 10 is re-authenticated in Domain 2, then a new attribute certificate is created and issued to the user, otherwise the user is trusted and access granted without further re-authentication.

The above approach imposes the following requirements on browsers and clients. The system must be able to support attribute certificates. Also, the system must be able to replace or update an existing certificate. Furthermore, it is possible to drive a browser or client from the web server to cause it to generate key pairs. Still further, clients and servers can exchange multiple certificates when setting up a Secure Socket Layer (SSL) protocol session. This was specified in the original SSL draft, published in 1995, which only dealt with server side certificates. It is included in Transport Level Security (TLS), the IETF standard track protocol to replace SSL, see Request for Comments (RFC) 2246 for both clients and servers. It is not clear how widely supported this feature really is. In particular we just do not know what will happen if attribute certificates are included in the sequence of certificates presented. In addition to the above, requirements are imposed on servers and PMIs to issue certificates and to maintain minimal session state information.

Figure 2:
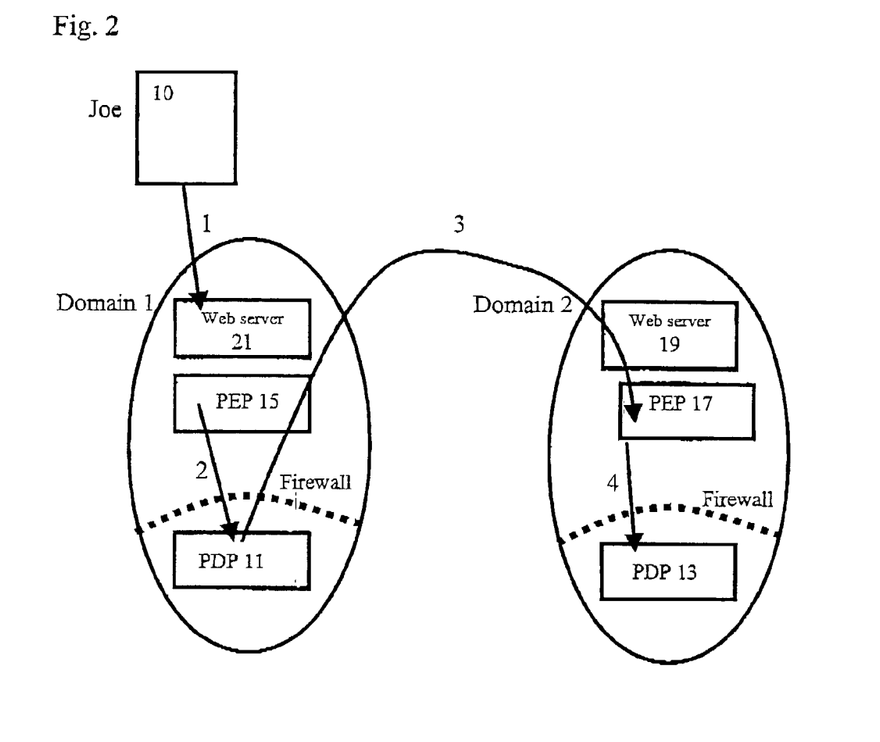
FIG. 2 is a schematic representation of an example of a request made by a user in which the request is made to a first domain and that request requires information from a second domain.

An approach for the exchange of authorisation information between domains is to use hypertext transfer protocol (HTTP) as a transport. This has the advantage that the protocol infrastructure is already in place, having been widely implemented in use for the internet. FIG. 2 shows a simple scenario in which the PDP 11 in Domain 1 needs to get policy information from the PDP 13 in Domain 2. In the example the kind of information which may be required could be "is Joe good for $100?" or "is Joe a gold card customer?".

The reference numerals in FIG. 2 refer to the following steps:
1. Request from Joe received by Domain 1 PDP 11, Domain 1 PDP 11 needs policy information from Domain 2.
2. Domain 1 PEP 15 requests authorisation from Domain 1 PDP 11.
3. Domain 1 PDP 11 requests authorisation from Domain 2.
4. Domain 2 PEP 17 recognises and forwards authorisation request to Domain 2 PDP 11.

In this scenario, when Joe 10 registers with Domain 1 he provides the URLs of the third party (or parties) that can provide relevant information about him, for example his credit worthiness. Alternatively, the URL can he encoded into the business logic of Domain 1.

Joe 10 then begins using the site in Domain 1 and reaches a point where the PDP 11 in Domain 1 needs to know if Joe 10 is a "Gold Card" customer in Domain 2. The Domain 1 PDP 11 constructs an unsigned attribute certificate containing the "Gold Card" attribute and sends it to the URL for Domain 2 using HTTP. This could be implemented using the HTTP post method documented in the IETF RFC 1945, to carry certificate request message format (CRMF) messages (as disclosed in RFC 2511 mentioned above). This has the advantage that the existing HTTP authorisation infrastructure can be re-used to control who can make authorisation requests. Authorisation data may be sensitive because of privacy issues. This implies that the CRMF message also needs to be authenticated. In addition the CRMF message may be encrypted. This could be implemented using HTTP/SSL (Hypertext Transfer Protocol/SSL). However, this approach has some weaknesses, as discussed below.

Assuming that Joe does have "Gold Card" status and Domain 1 PDP 11 is authorised to make such a request in Domain 2, Domain 2 PDP 13 will sign the certificate with an appropriate validity period and return it in response to the request. The PDP 11 in Domain 1 now has all the information it needs to authorise Joe and can also store the certificate for future use (until it is no longer valid). The PDP 11 will need to manage the validity of certificates issued by third parties. Online certificate status protocol (OCSP), as disclosed in IETF RFC 2560, could be used or this. Alternatively, PDPs 11, 13 could exchange CRLs, or simply wait until a certificate is about to expire and request a new certificate.

If Joe does not have "Gold Card" status in Domain 2, Domain 2 PDP 13 needs to return an error message. We cannot assume a direct SSL connection between the PDPs 11, 13, so just returning a simple error message (e.g. denied) with no context is not sufficient. An attacker might replay a previously captured denied message before Domain 2 PDP 13 replies with a certificate that might permit access. In this way the attacker could deny access.

There are several options for returning an error message including the following:
- a certificate is returned with the negated attribute e.g. "Gold Card Denied". The validity period of this certificate could be used to check that it is current information;
- a certificate containing a special "denied" attribute is returned. Care would be needed to match this to the attribute requested—this could be done by using the hash of the request as an identifier.

A cryptographic hash function is a mechanism of generating a unique identifier (usually called the hash) from a document (usually 128 bits and longer). They have the property that it is extremely unlikely that two documents will generate the same hash. It is also extremely hard to generate the document from the hash. This means that it is hard to generate a different document that has the same hash as a given document. An analogy that is often used, is that it is the finger print of the data. There are several well known hash algorithms documented in the literature that will be known to anybody skilled in the art. These include SHA-1 and MD5.

Now suppose that Domain 1 PDP 11 needs to confirm a dynamic attribute of Joe 10, for example is he good for $100? Exactly the same procedures as those described above can be followed. The difference is that in this case the attribute contained in the certificate is "$100 purchase" and the certificate returned by Domain 2 PDP 13 will have a zero or very short validity period. Note that although Domain 2 PDP 13 may not intend for this certificate to be reused, it cannot prevent it from being reused. It is probably better to rely on application logic and social or legal protocols to deal with this: Domain 1 might only yet paid a maximum of $100 for each certificate it can produce in the case of a dispute.

Note that a consequence of the above is that the communication flow is really from PDP 11 Domain 1→web server 19 Domain 2→PEP 17 Domain 2→PDP 13 Domain 2. In this type of flow the PEP 15, 17 would need to know how to act upon an authorisation request coming from a PDP 11, 13 in another domain.

Authorisation information may be considered private. In this case it would not be desirable to exchange such information unencrypted. The simplest thing to do would be to establish an HTTP/SSL connection from Domain 1 PDP 11 to Domain 2's web server 19. This would allow us to use the existing authorisation infrastructure to ensure that the PDP 11 of Domain 1 is authorised to retrieve this information. For example a credit card company may not want to allow anybody to query whether any of their card holders is "good" for the purchase of $100 worth of goods, or holds a gold card. Rather they may only want to reveal this information to "approved" vendors.

Note also that authorisation information may need to be protected against replay. For example, if we are dealing with dynamic session information, if attackers could replay the authorisation they might be able to keep the session valid after the user had closed it down.

We have assumed that it is not possible or desirable to have a direct TCP connection between PDPs 11, 13. Customers may not want to expose the PDP 11, 13 to a direct connection from the internet (nor deal with the opening of additional ports on the firewall). This is why communication between PDPs 11, 13 is relayed through web servers 19, 21. Unfortunately, due to the limitations of HTTP/SSL this is not an end to end solution (PDP to PDP). Instead we are trusting intermediating web servers and PEPs 15, 17 not to disclose or tamper with the CRMF messages or replies.

An end to end solution requires a protocol that provides similar guarantees to SSL but can operate in a multi-hop environment. Hewlett Packard has developed such a protocol "session layer security" (SLS) protocol as part of its e-speak platform. This protocol is Open Source. This protocol allows a secure exchange of messages between PDPs 11, 13 relayed through intermediate web servers over HTTP.

Using CRMF to transmit authorisation requests allows us to batch authorisation requests (multiple certification requests can be made in a single message). A single CRMF message could be routed through multiple PDPs 11, 13, each PDP 11, 13 issuing one or more of the certificates. Such a scenario is described in IETF RFC 2905 of the Internet Society. Multi-hop scenarios like this turn PDPs 11, 13 into routing engines for authorisation requests. This opens up some of the pitfalls of routing like message loops. A hop count might be useful to avoid these.

In addition security in a multi-hop scenario might prove challenging. As the CRMF request is routed from PDP 11, 13, some of the following issues need to be considered.

should all PDPs 11, 13 be able to see all elements of the CRMF request? Perhaps some elements should be encrypted so that only certain PDPs can see them;

if certificates are added to the message how are these protected from unauthorised disclosure or unauthorised removal from the message?;

how is routing information encoded?

If two sites are exchanging a lot of authorisation information, then they might find that signing each certificate imposes a significant performance overhead. They may choose to establish a secure session (using an appropriate protocol) and to exchange unsigned certificates, assuming them to be secure and treating them as though the other party has signed them. However, this provides no protection against non-repudiation. One party could send unsigned authorisation information and then later deny sending it. One trade-off might be to sign the hash of a sequence of unsigned certificates.

One of the problems with the approach discussed above for a multi-domain authorisation is that Joe has to remember to update the registration information he has provided whenever it changes, if for example he changes banks. This is probably not too onerous if he is registered with a single site. However, if he is registered with multiple sites he may not remember so update them all in a timely fashion.

SUMMARY OF THE INVENTION

According to a first aspect of the present invention a method of multi-domain authorisation/authentication on a computer network comprises:

a user making a request to a policy enforcement point (PEP) of a computer for access to information or a service on the computer which requires authorisation for access;

providing a location address for a user's authorisation and/or authentication information, at which address authorisation and/or authentication information and/or further personal information of the user has been pre-stored;

a policy decision point (PDP) of the service on the computer network then verifying the authorisation/authentication information or seeking authorisation/authentication from an address provided in the pre-stored authorisation/authentication/further information; and the user being given access by the PEP to the information or the service requested, if the request is accepted, wherein the user's authorisation/authentication and/or further information is located on a meta policy decision point (MPDP), and in which the MPDP is hosted by a party independent from the user According to another aspect of the invention a method of multi-domain authorisation/authentication on a computer network comprises:

a user making a request to a policy enforcement point (PEP) of a computer for access to information or a service on the computer which requires authorisation for access;

providing a location address for a user's authorisation and/or authentication information, at which address authorisation and/or authentication information and/or further personal information of the user has been pre-stored;

a policy decision point (PDP) of the service on the computer network then verifying the authorisation/authentication information or seeking authorisation/authentication from an address provided in the pre-stored authorisation/authentication/further information; and the user being given access by the PEP to the information or the service requested, if the request is accepted, wherein the users authorisation/authentication information and/or further information is located on a meta policy decision point (MPDP), wherein a plurality of MPDPs are provided and are operable to communicate with one another.

The plurality of MPDPs may be controlled by a number of independent entities.

According to another aspect of the invention, a method of multi-domain authorisation/authentication on a computer network comprises;

a user making a request to a policy enforcement point (PEP) of a computer for access to information or a service on the computer which requires authorisation for access;

providing a location address for a user's authorisation and/or authentication information, at which address authorisation and/or authentication information and/or further personal information of the user has been pre-stored;

a policy decision point (PDP) of the service on the computer network then verifying the authorisation/authentication information or seeking authorisation/authentication from an address provided in the pre-stored authorisation/authentication/further information; and the user being given access by the PEP to the information or the service requested, if the request is accepted, wherein the user's authorisation/authentication and/or further information is located on a meta policy decision point (MPDP), and in which the information held on the MPDP is amendable by the user, to update the information.

The user's authorisation/authentication and/or further information may be located on a meta policy decision point (MPDP).

The MPDP may be remote from the user.

The user's request may be to a world wide web server.

The location address for the user's authorisation/authentication information and/or further information is preferably the address of the MPDP, most preferably a sub-address of the MPDP that is unique to the user.

The MPDP may hold one or more digital certificates of the user. The MPDP may hold one or more passwords and/or user names of the user for access to information or services. The MPDP may hold digital certificate key-pairs.

The MPDP may hold personal bank details and/or credit/charge card details of the user, or may hold address details for a computer of a user's bank, or medical information/other personal information of the user.

The information held on the MPDP may be amended by the user, to update the information for example.

The MPDP may hold information concerning the location of another computer, preferably a PDP of a computer, that can provide authorisation/authentication information or confirmation of authorisation/authentication information.

The MPDP advantageously provides a single location for a user's authorisation/authentication information for provision to other computers on a computer network, together with a single location for a user's online credentials, such as bank details.

The MPDP may hold information concerning to which parties a user is willing to provide authorisation/authentication information, the MPDP being programmable by the user to specify said parties.

The MPDP may store information as to which third parties have accessed information concerning the user from the MPDP.

The method may include the MPDP being a Certification Authority (CA), which may issue digital certificates to servers, which maybe service/information providers, to confer membership of a market place to those servers.

The method may include the MPDP issuing credential revocation and revalidation of a user. The MPDP may receive information for credential revocation from a service provider and may use that information to modify a user's authorisation/authentication information on the MPDP.

The or each MPDP or PDP may be located behind a firewall.

The invention extends to a computer programmed to perform any of the method aspects described above, in particular to perform the function of the MPDP described above.

The invention extends to a recordable medium bearing a computer program to perform any of the method aspects described above, in particular the functions of the MPDP.

The invention extends to a user interface for a computer that is operable to allow a user to update his authorisation/authentication/other information stored on the MPDP.

According to a further aspect of the invention a method of enabling multi-domain authorisation/authentication on a commuter network comprises:

providing storage and a location address independent from a user for the user's authorisation and/or authentication information, at which address said information has been pre-stored, the location address being given by a user when a request to access a service on a computer network made for which service authorisation is required.

All of the above aspects can be combined with any of the features disclosed herein, in any combination.

BRIEF DESCRIPTION OF THE DRAWINGS

A specific embodiment of the present invention will now be described, by way of example, and with reference to the accompanying drawings, in which.

DESCRIPTION OF PREFERRED
EMBODIMENTS OF THE INVENTION

In order to address the problem of a user 10 having to remember multiple passwords and having to remember to update multiple pages of registration information, a system for the management of a person's online persona is used. The system is called a meta Policy Decision Point (MPDP) 12 (see FIG. 3).

Figure 3:
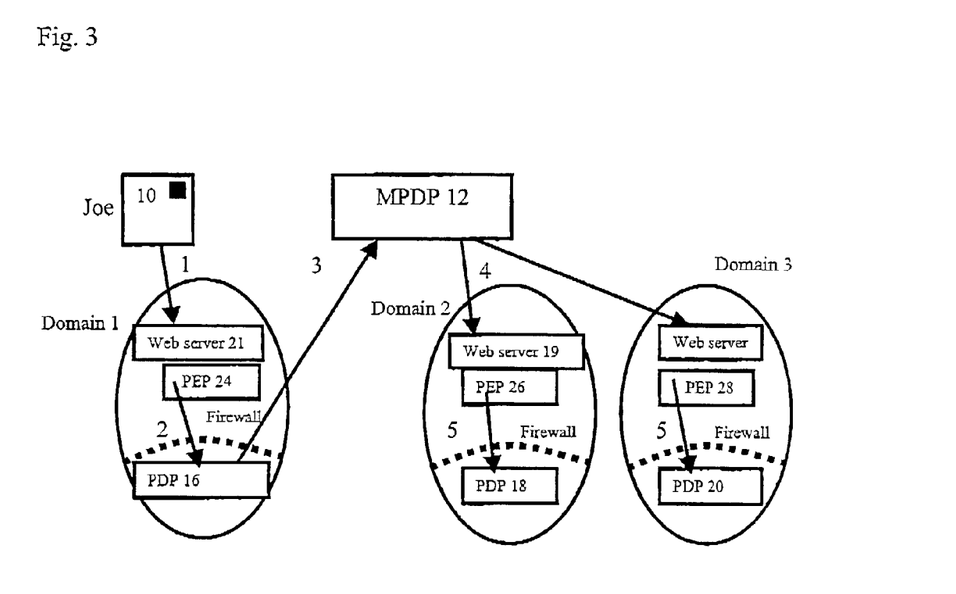
FIG. 3 is a schematic diagram showing an implementation of a meta Policy Decision Point (MPDP) showing the interaction used when a user requests information from a first domain, which domain requires information from further domains, by use of a MPDP.

Put briefly, when a user 10 registers with Domain 1, instead of providing the URLs (universal resource locators) for his bark's policy decision point (PDP), he provides the URL of his MPDP 12. The user having already registered his bank's URL with the MPDP. When a first domain, Domain 1 PDP 16 needs authorisation information from a third party it sends a certificate request message format (CRMF) request containing the attributes that need to be authorised to the MPDP 12 that the user 10 gave when he registered in Domain 1. The user's MPDP 12 can either return the attributes directly or redirect the request to the appropriate PDP 18, 20. This is shown in FIG. 3. It is possible that redirect may not be an option, if the CRMF message contains multiple certification requests.

In FIG. 3 the reference numerals refer to the following requests and operation:

1. Request from Joe needing policy information from Domain 2.
2. Domain 1 policy enforcement point (PEP) 24 requests authorisation from Domain 1 PDP 16.
3. Domain 1 PDP 16 requests authorisation from MPDP 12.
4. MPDP 12 requests authorisation information from Domains 2 and 3.
5. PEPs 26, 28 recognised and forward request for authorisation information to their respective PDPs 18, 20.

The protocol between the PDP 16, 18, 20 and MPDP 12 should ensure integrity, privacy and enable authentication of both parties. This protocol should be the same as the PDP to PDP protocol described above—thus the MPDP 12 requires no further standardisation activity. It is likely that authorisation will be needed before the MPDP 12 will accept the CRMF request. One model is for the MPDP to only accept requests from PDPs that the user has explicitly authorised—see below.

The main concept behind the MPDP 12 is that it provides one place where a user 10 manages his online persona. When the user first registers with the MPDP 12 it issues him with an attribute certificate with his personal URL in it. He can then present the certificate when he wants to manage his identity. Examples of this kind of information which the user might manage are:

- who can assess what (authorisation) information about him;
- who has accessed what authorisation information about him;
- change the URLs for PDPs generating authorisation information about him.

The MPDP 12 also provides some additional useful functions. It could act as a market governance authority issuing certificates to service providers conferring membership of the market place. Service providers might use these certificates to authorise the exchange of session information, or for retrieval of authorisation information.

A natural extension is for the MPDP 12 to provide secure storage for a user's certificates and key-pairs so that they could be downloaded into any device that the user happened to be using. Within the IETF a new working group (Securely Available Credentials (SACRED) is working to standardise a protocol to support the above. This solves one of the major problems associated with using certificates for single sign on, which is that if the user does not always use the same device or uses a shared device, some problems can arise. The present invention solves those problems.

The federation of MPDPs 12 requires no further technology. MPDPs 12 contain URLs that are pointers to PDPs or other MPDPs. The protocol to talk to PDPs 16, 18, 20 and MPDPs 12 is the same. The system can be implemented by use of the java and XML languages. Alternatively, the above and that which is described below could be implemented using the SAML framework proposed by the Oasis Organisation (mentioned above).

MPDPs 12 are also able to usefully participate in credential revocation and revalidation. Not only can an MPDP 12 allow users 10 to control who can retrieve certificates containing information about them, it can also notify market members when a user's 10 credentials become invalid. It might do this for example when Joe loses his "Gold Card" status. This could be implemented by the use of a certificate revocation list (CRL) as is already commonly used in relation to digital certificates.

The MPDP 12 also provides credential aggregation as a service by batching together all certificates for a single user and validating them and issuing a single signed structure. Other PDPs 16, 18, 20 can decide to trust the MPDP 12 to do this kind of validation for them. One of the benefits of this is that it makes management easier for the PDPs 16, 13, 20, because they do not have to worry about keeping up to date information about all possible issuing authorities.

The MPDP 12 can store general attributes, rather than just a list of resources accessible by a user. The general attributes include e.g. "gold card" status, credit limit values etc.

Whether or not a party trusts an MPDP 12 for this latter operation is a question of judgement. There could be liability issues for the MPDP 12 operator for this service. It would also be necessary to ask how trusted are the sources of the MPDP data, it might aggregate authorisation from a variety of sources, some less trusted than others. For example, in a large organisation one could envisage the MPDP 12 using the corporate directory as a source of information.

When a user 10 registers with an MPDP 12 service he provides URLs of real PDPs and possibly other profile information such as bank account numbers and the like. There are privacy issues. The MPDP 12 is being trusted by the user 10 not to abuse this information. One solution to this problem is for the user 10 to encrypt the information in the MPDP 12 so that the MPDP 12 cannot read it. As part of registering with a service or portal, the user 10 provides the key or keys needed to decrypt the information they need to see in the user's MPDP 12 entry.

One consequence of this approach is that the MPDP 12 would be no longer be transparent. PDPs 16, 18, 20 would have to use a different protocol to talk to it.

Figure 4:
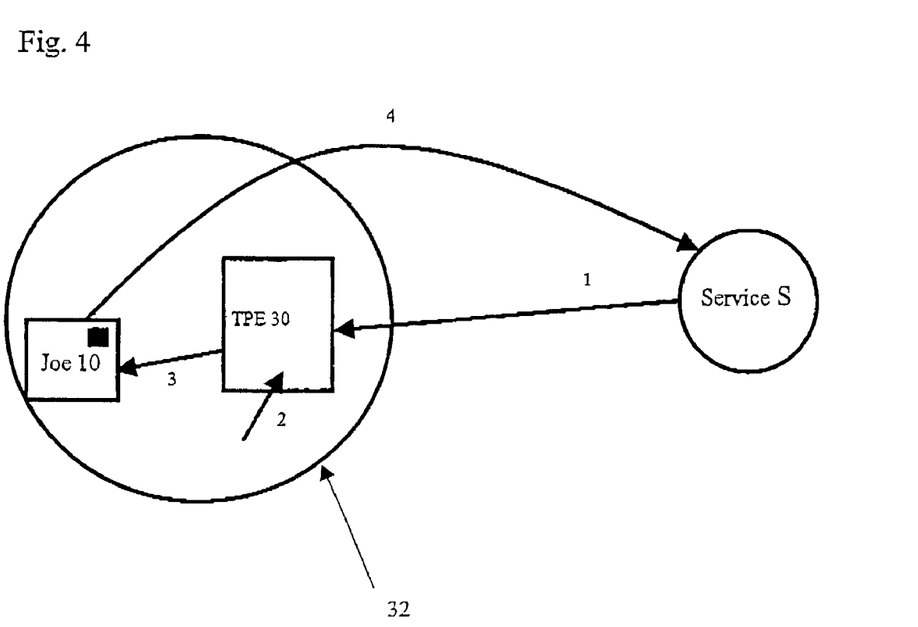
FIG. 4 is a schematic diagram of a trusted policy evaluator for remote evaluation of access control policies.

The Trusted Policy Evaluator (TPE) 30 is a trusted (hardware) engine for remote evaluation of access control policies. A possible scenario is shown in FIG. 4.

In this scenario the service S uploads (at arrow 1) its policy for access to the TPE 30 that resides in a user's 10 domain 32. The TPE has access to the user's credentials as well as the policy for access to S. If the user's credentials satisfy the policy, the TPE 30 issues the user 10 with a ticket (certificate) for access to S. S never sees the user's 10 credentials directly and the user 10 (nor anybody in the user's domain) never sees the policy controlling access to S.

The MPDP 12 could provide this as a service to users 10 and service providers. For this work a common policy language would be needed, as well as a common format for authorisation attributes. This means that the MPDP 12 (or MPDPs—there are likely to be many) would take care of retrieving and checking all credentials against access control policies.

An alternative scenario is to argue that the MPDP 12 is fundamentally about how to find and retrieve authorisation attributes. The TPE 30 is fundamentally about how to evaluate these attributes against access control policies while keeping the attributes and policies confidential. The TPE 30 might use the MPDP 12 to retrieve authorisation attributes. Hence the TPE 30 could be run as a separate engine alongside the MPDP 12.

It would seem that running a TPE 30 inside or alongside the MPDP 12 is a natural evolutionary step once MPDPs 12 are deployed.

The benefits of an MPDP 12 to its users 10 would be;

- provision of one place to update information such as bank details, personal profile information etc;
- a user 10 can control who can access information about them from the MPDP 12 (including revoking the privilege);
- the user 10 can see who is accessing what information about him;
- the user 10 can download his digital persona (keys and certificates) onto any device, this provides mobility;
- the user 10 can use the MPDP 12 to make publicly available (through the MPDP 12) certain information for targeted advertising, for example he may transmit information indicating his interest in certain products or services;
- the MPDP 12 can eventually evolve into a personal portal providing email accounts etc.

A large organisation, which may run MPDPs 12 to drive its internal PMI infrastructure, may not permit its employees to have all the control mentioned above.

To the operator of the MPDP 12 described above the benefits are that a corporate MPDP 12 operator would have one place to manage digital identities to drive the PMIs on its intranet and also one place to manage validity and revocation information.

To an Internet MPDP 12 operator, the advantages would be that revenue is derived from targeted advertising; fees could be charged per authorisation from service providers when they use the service to get authorisation information. Also, service providers could be charged to be members of the market place, for certificates issued.

The benefits to service providers are that a better experience is provided for their users and that there is better regulation of the market place provided by a notion of membership and the managed revocation and revalidation of multiple domain credentials.

In implementation, the MPDP 12 will be indistinguishable from ordinary PDPs 15, 18, 20 until it starts acting in a market governance role and/or starts charging for authorisation information. Until this time service providers will perceive a PDP to which they send CRMF encoded information requests.

The MPDP 12 described above is intended to be used as a security e-service. The MPDP 12 requires no further standardisation effort. It provides a single point to manage groups of PMIs by providing a routing service for authorisation requests; it knows where to get the authorisation information associated with a given user. It provides a single point to manage a user's online persona or credentials. It provides market governance services, certifying users and services to be members of the market place and distributing information about the revocation of credentials. It could be deployed as a service in the intranet and well as in the internet. The MPDP 12 function could grow beyond security, for example user profile information might be sold for targeted advertising, subject to the permission of users.

It is envisaged that there will not be a single MPDP, but that many different enterprises will run MPDPs without central control. The MPDPs can work together as described above. The plurality of separate MPDPs is intended to address the social, legal and trust problems that would arise if one global authority or enterprise was responsible for managing sensitive (security) information.

It has also been shown how the MPDP could remove one of the barriers to public key encryption deployment.

The above discusses a pull model for authorization: a PDP 16, 18, 20 requesting authorisation information from other PDPs 16, 18, 20. Sometimes a push model could have advantages, especially in relation to the use of the same protocols to distribute session information. A push model involves the sending of information to another PDP without first having received a request from it.

The invention claimed is:

1. A method of multi-domain authorisation/authentication on a computer network comprises:
   a user making a request to a policy enforcement point (PEP) of a computer for access to a service on the computer of a first domain which requires authorisation for access from a second domain;
   providing a location address for a meta policy decision point (MPDP) maintaining the user's authorisation and/or authentication information provided from different issuing authorities, at which address authorisation and/or authentication information and/or further personal information of the user has been pre-stored at a remote location;
   a policy decision point (PDP) of the service on the computer network then verifying the authorisation/authentication information received from the MPDP or seeking authorisation/authentication from an address received from the MPDP, the address provided in the pre-stored authorisation/authentication/further personal information; and
   the user being given access by the PEP to the information or the service requested, if the request is accepted, wherein the MPDP is hosted by a party independent from the user.

2. A method of multi-domain authorisation/authentication on a computer network comprises:
   a user making a request to a policy enforcement point (PEP) of a computer of a first domain for access to a service on the computer which requires authorisation for access from a second domain;
   providing a location address for a meta policy decision point (MPDP) maintaining the user's authorisation and/or authentication information provided from different issuing authorities, at which address authorisation and/or authentication information and/or further personal information of the user has been pre-stored at a remote location;
   a policy decision point (PDP) of the service on the computer network then verifying the authorisation/authentication information received from the MPDP or seeking authorisation/authentication from an address received from the MPDP, the address provided in the pre-stored authorisation/authentication/further personal information; and
   the user being given access by the PEP to the information or the service requested, if the request is accepted, wherein a plurality of MPDPs are provided and are operable to communicate with one another.

3. A method as claimed in claim 2, wherein the plurality of MPDPs are controlled by a number of independent entities.

4. A method of multi-domain authorisation/authentication on a computer network comprises:
   a user making a request to a policy enforcement point (PEP) of a computer of a first domain for access to information or a service on the computer which requires authorisation for access from a second domain;
   providing a location address for a meta policy decision point (MPDP) maintaining the use's authorisation and/or authentication information provided from different issuing authorities, at which address authorisation and/or authentication information and/or further personal information of the user has been pre-stored at a remote location;
   a policy decision point (PDP) of the service on the computer network then verifying the authorisation/authentication information received from the MPDP or seeking authorisation/authentication from an address received from the MPDP, the address provided in the pre-stored authorisation/authentication/further personal information; and
   the user being given access by the PEP to the information or the service requested, if the request is accepted, in which the information held on the MPDP is amendable by the user, to update the information.

5. A method of multi-domain authorisation/authentication as claimed in claim 1, in which the location address for the use's authorisation/authentication information and/or further information is the address of the MPDP.

6. A method of multi-domain authorisation/authentication as claimed in claim 5, in which the location address is a sub-address of the MPDP that is unique to the user.

7. A method of multi-domain authorisation/authentication as claimed in claim 1, in which the MPDP holds personal bank details and/or credit/charge card details of the user.

8. A method of multi-domain authorisation/authentication as claimed in claim 1, in which the MPDP holds address details for a computer of a user's bank, or medical information/other personal information of the user.

9. A method of multi-domain authorisation/authentication as claimed in claim 1, in which the MPDP holds information concerning the location of another computer that can provide authorisation/authentication information or confirmation of authorisation/authentication information.

10. A method of multi-domain authorisation/authentication as claimed in claim 1, in which the MPDP holds information concerning to which parties the user is willing to provide authorisation/authentication information.

11. A method of multi-domain authorisation/authentication as claimed in claim 10, in which the MPDP is programmable by the user to specify said parties.

12. A method of multi-domain authorisation/authentication as claimed in claim 1, in which the MPDP stores information as to which third parties have accessed information concerning the user from the MPDP.

13. A method of multi-domain authorisation/authentication as claimed in claim 1, which includes the MPDP being a certification authority (CA) which issues digital certificates to servers to confer membership of a market place to those servers.

14. A method of multi-domain authorisation/authentication as claimed in claim 1, in which the method includes the MPDP issuing credential revocation and revalidation of a user.

15. A method of multi-domain authorisation/authentication as claimed in claim 1, in which the MPDP receives information for credential revocation from a service provider and uses that information to modify a user's authorisation/authentication information on the MPDP.

16. A computer programmed to perform the method of claim 1.

17. A computer as claimed in claim 16, which is programmed to perform the function or the MPDP described in relation to claim 1.

18. A computer programmed to perform the method of claim 2.

19. A computer programmed to perform the method of claim 4.

20. A recordable medium bearing a computer program operable to perform the method of claim 1.

21. A recordable medium bearing a computer program operable to perform the functions of the MPDP described in relation to claim 1.

22. A recordable medium bearing a computer program operable to perform the method of claim 2.

23. A recordable medium bearing a computer program operable to perform the method of claim 4.

24. A user interface for a computer is operable to allow a user to update his authorisation/authentication/other information stored on an MPDP as described in relation to claim 1.

25. A method of enabling multi-domain authorisation/authentication on a computer network comprises:
provided storage and a location address independent from a user for the user's authorisation and/or authentication information provided from different issuing authorities, at which address said information has been pre-stored, the location address being given by a user when a request to access a service on a computer network is made for which service authorisation is required, in which the service obtains authentication or authorisation information for validating said user from said location.

* * * * *